Jan. 5, 1965 E. SCHASCHL ETAL 3,164,009
APPARATUS FOR MEASURING THE WALL THICKNESS OF TUBING
Filed Oct. 7, 1960 2 Sheets-Sheet 1

INVENTORS
EDWARD SCHASCHL
GLENN A. MARSH
BY Edward H. Lang
ATTORNEY

INVENTORS
EDWARD SCHASCHL
GLENN A. MARSH
BY
*Edward H Lang*
ATTORNEY 3,164,009
APPARATUS FOR MEASURING THE WALL
THICKNESS OF TUBING
Edward Schaschl and Glenn A. Marsh, Crystal Lake, Ill.,
assignors to The Pure Oil Company, Chicago, Ill., a
corporation of Ohio
Filed Oct. 7, 1960, Ser. No. 61,199
3 Claims. (Cl. 73—88.5)

This invention relates to an apparatus for measuring tubular articles to determine the wall thickness thereof. The device is insertable within the article, and only the interior thereof need be accessible to use the device.

The prior art teaches the use of devices adapted to measure the wall thickness of a tube from the interior thereof, and determine the presence or absence of irregularities in the exterior surface of the tube. Most such devices operate by passing an electric or magnetic current through the tube wall. Some prior art devices instead rely upon the use of ionizing radiations. None of the prior art devices has proved to be altogether satisfactory.

In order to ascertain the effects of corrosion and to determine the need for protective measures, it is frequently desired to determine metal loss from the external surface of tubular structural members such as oil well casings, but in the case of many such members, the external surfaces may not be accessible. Internal metal loss can be determined with a fair degree of accuracy by the means of internal calibers. External metal loss may be determined by a device capable of measuring the thickness of the tubular structure.

It is an object of this invention to provide an apparatus insertable within a tubular structure for determining the local wall thickness thereof at any particular location. Yet another object of this invention is to provide a convenient means for determining the loss of metal from the inaccessible exterior of a tubular member. Another object of this invention is to provide an apparatus insertable within a tube for measuring the local wall thickness of the tube.

Briefly, the device of this invention applies opposing forces against points on the internal surface of a tubular member. When force is applied against a relatively thin spot in the tubular member, where metal loss has occurred, the tubular member is deflected to a greater extent under the applied load. The device of this invention includes means for measuring the magnitude of the applied force, and means for measuring the extent of deflection of the surface to which force is applied. By correlating corresponding measurements of applied force and deflection, the wall thickness of the tubular structure at the points of force application may be determined.

This invention is best described with reference to the drawings, of which:

Figure 2:
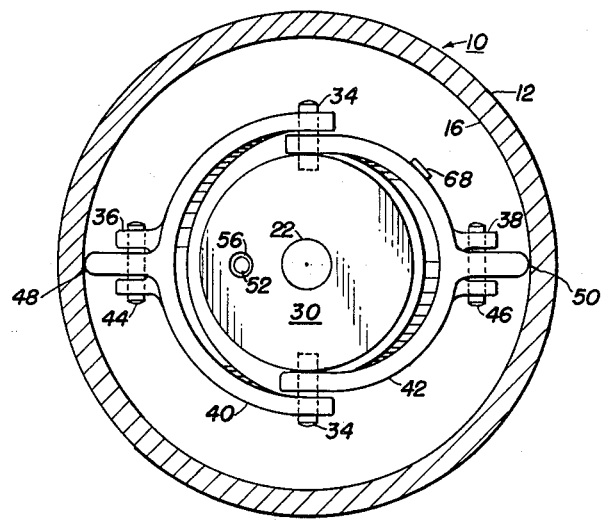
FIGURE 2 is a bottom view of the device depicted in FIGURE 1.
Figure 1:
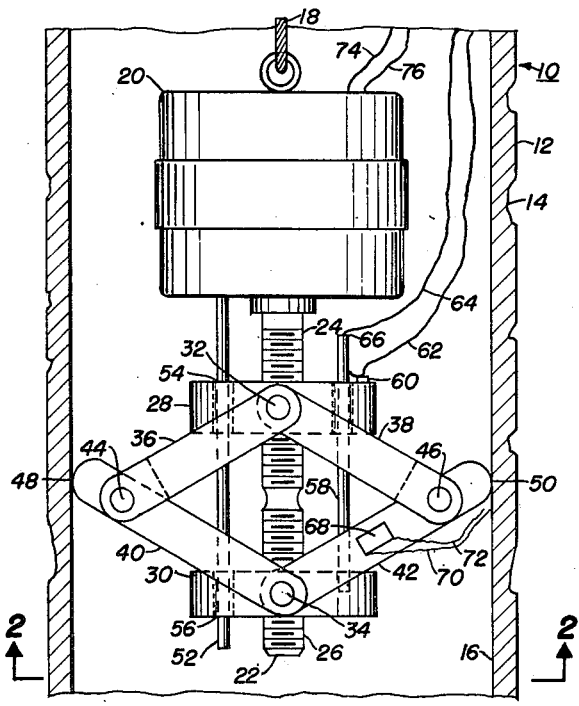
FIGURE 1 is an elevational view of an apparatus in accordance with this invention.

Referring to FIGURE 1, cylindrical tube 10 has been subjected to corrosion, and the exterior surface 12 of the tube is deformed by a series of pits, such as 14. The metal thickness of the tube wall adjacent to such pits is substantially less than the normal wall thickness. The interior surface 16 of the tube 10 is relatively smooth. Supported within the tube by cable 18 is the device of this invention, which includes housing 20 containing an electric motor and suitable reduction gearing. Extending from housing 20 is threaded shaft 22, which shaft is provided with threaded portions 24 and 26. The threaded portions preferably have the same pitch, but the threads are of opposed sense. That is, one thread is left-handed while the other is right-handed. A pair of opposed nut members, 28 and 30, are disposed on shaft 22 and engage the opposed threads 24 and 26, respectively. Nut member 28 is provided with a pair of pins 32, and nut member 30 is provided with a pair of pins 34. Pins 32 pivotably secure two wish-bone-shaped arms 36 and 38. Similarly, pins 34 pivotably secure two wish-bone-shaped arms 40 and 42. Arm 36 is pivotably secured to arm 40 by pin 44, and similarly, arm 38 is pivotably secured to arm 42 by pin 46. Thus a parallelogram arrangement of the arms is provided.

Arms 40 and 42 extend outwardly of arms 36 and 38, respectively, at 48 and 50 to provide suitable points of contact with the internal surface 16 of the tube 10. The extending ends of arms 36 and 38 are bifurcated to accommodate arms 40 and 42. It is evident that as shaft 22 rotates, nut members 28 and 30 will move along the threads 24 and 26 in a direction either towards or away from each other, depending upon the direction of rotation of shaft 22. As the shaft begins to rotate, the inertia of the arms pivotably secured to nut members 28 and 30 is sufficient to prevent substantial rotation of the nut members until the ends 48 and 50 of arms 40 and 42 contact the interior surface 16 of the tube 10. However, if desired, rod 52 may be provided to key the two nut members to housing 20. Thus rod 52, which is supported by housing 20, passes slidably through two holes provided therefor in nut members 28, and 30, at 54 and 56, respectively. Rod 58, which preferably is fabricated to have a relatively high electrical resistance, is secured to nut member 30, passes through nut member 28, and is contacted by brush 60 which is supported by nut member 28 in electrically insulated relationship therewith. Electrical conductor 62 is connected to brush 60, and electrical conductor 64 is connected to the terminal end 66 of rod 58. These conductors lead to a suitable resistance-measuring device, not shown. It is evident that as the nut members 28 and 30 move with respect to each other, in response to rotation of shaft 22, the length of rod 58 extending between brush 60 and the terminal end 66 of the rod will vary. Accordingly, the electrical resistance between the brush 60 and the terminal end 66 of the rod will also vary, and provide a measure of the change in relative positions of nut members 28 and 30. A strain gauge 68 is secured to arm 42 of the apparatus. This strain gauge measures the deflection of arm 42, and thereby the force applied by the arm to the internal surface 16 of tube 10. Two electrical conductors, 70 and 72, are provided to connect the strain gauge to appropriate measurement circuits.

Electrical conductors 62, 64, 70, 72, 74, and 76, the latter two of which provide power to the electric motor, may extend directly to accessory electrical equipment located externally of tube 10. Such equipment is conventional electronic instrumentation, and comprises no part of the instant invention. It is preferred, however, that conductors 62, 64, 70, and 72 extend only to within case 20, wherein is provided appropriate electronic equipment for delivering amplified signals responsive to the resistances of strain gauge 68 and the portion of rod 58 extending outward of brush 60. Thus the inaccuracies which would otherwise be introduced through the use of long leads are eliminated.

In operation, the device is inserted within a tube, and the electric motor is energized so that nut members 28 and 30 approach each other, and the ends 48 and 50 of arms 40 and 42 move radially outward. Contact is made with the interior surface of the tube, and force applied radially outward thereto. The tube deflects under the applied force, the extent of deflection being proportional to the tube wall thickness at the points of force application. It is evident that strain gauge 68 provides a measure of the force applied to the tube interior, while the resistance of the portion of rod 58 between brush 60 and the terminal end of the rod 66 provides a measure of the position of the nut members, and therefore also of the radial position of ends 48 and 50 of arms 40 and 42. It is preferred that the auxiliary electronic equipment employed, externally of the tube, be of the type which provides a continuous record, such as a strip-chart trace, of the resistance of the strain gauge and of the terminal portion of rod 58. Thus corresponding values of applied force and tubing deflection are readily ascertainable. Alternatively, the motor may be permitted to rotate shaft 22 until the torque output of the motor becomes insufficient to provide further rotation of shaft 22, and a single measurement of strain and of the resistance of the terminal portion of rod 58 may then be taken.

Figure 3:
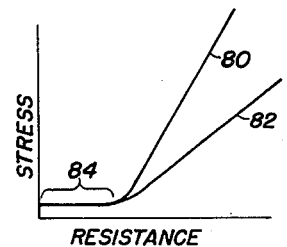
FIGURE 3 is a graph showing plots of stress versus resistance.

FIGURE 3 shows a graph depicting a plot of strain, as measured by strain gauge 68, against the resistance of the terminal portion of rod 58. Curve 80 is that typical of that obtained where the test is performed adjacent to un-corroded portions of the tube. Curve 82 is typical of that which would be obtained where metal has been removed from the tube exterior adjacent to the point of force application. Both curves are flat in the portion 84, which represents the free travel of the nut members and arms prior to contact with the tube interior. After contact with the tube interior is made, curves 80 and 82 diverge because of the differing tube stress to deflection relationships resulting from the differing wall thicknesses.

From the measured values of resistance and strain, it is possible by the use of conventional engineering calculations to arrive at the actual wall thickness of the tube at the point of force application. This method is tedious and it is much preferred that the device be calibrated in a tube of known wall thicknesses. It is especially preferred that the device be calibrated by preparing curves such as those shown in FIGURE 3 for a plurality of tubes having the same interior dimensions but differing wall thicknesses. A graph having a family of curves such as 80 and 82 will thus be obtained. Measurements taken on the tube to be tested can then be compared with the family of curves, and by interpolation, the actual wall thickness at the point of force application may be deduced with a high degree of accuracy.

Figure 5:
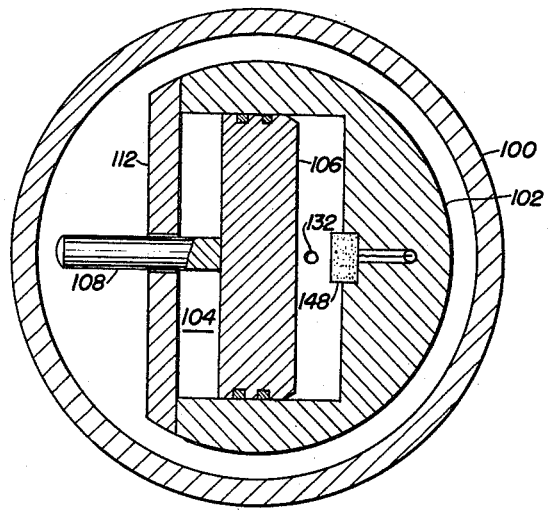
FIGURE 5 is a view of the device depicted in FIGURE 4 taken in the direction 5—5.
Figure 4:
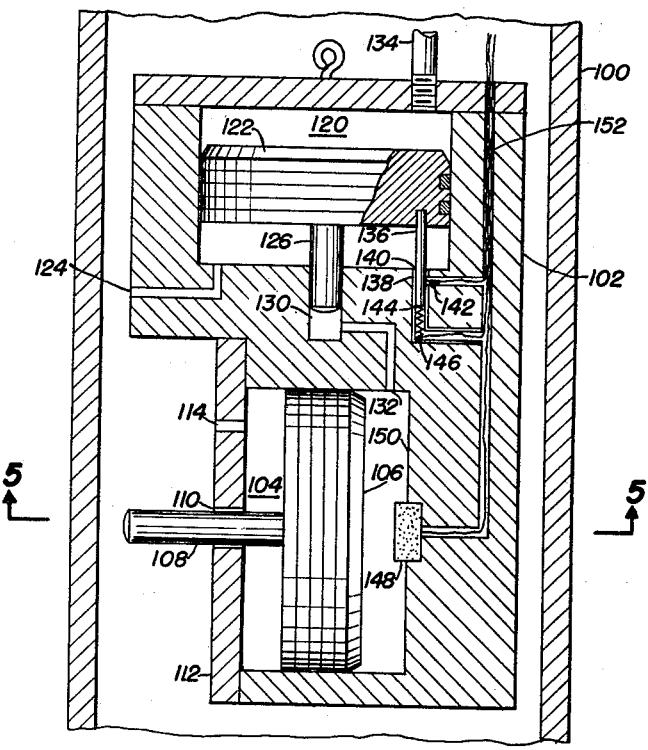
FIGURE 4 is an elevational view, in section, showing an alternate embodiment of the device of this invention.

Referring to FIGURES 4 and 5, an alternate embodiment of the apparatus of this invention is depicted. Within tube 100 is disposed housing 102, in which is provided a cylinder 104 which accommodates piston 106. A plunger 108, connected to piston 106, extends outwardly of the housing through opening 110 in plate 112. Vent 114 is provided to permit movement of piston 106. Housing 102 further includes a second cylinder 120 which accommodates piston 122. A vent 124 is provided to permit movement of piston 122. Plunger 126 extends from piston 122 into a third cylinder 130. Passageway 132 communicates the head of cylinder 130 with the head of cylinder 104. A fluid pressure-inlet 134 is provided for cylinder 120.

Also connected to piston 122 is rod 136, which is slidably supported in electrically insulating sleeve 138 which extends within hole 140 of the housing. A brush 142 is provided to make electrical contact at a point along the length of rod 136, and electrical connection is made with the terminal end 144 of rod 136 through spring 146, which is compressible to permit movement of the rod 136 within sleeve 138. A pressure-responsive crystal 148 is provided adjacent to head 150 of cylinder 104, to provide an electrical measure of the pressure within cylinder 104. A plurality of leads connecting to the pressure-responsive crystal 148 and to rod 136 pass through passage 152 to the exterior of the housing. The rod 136 operates in a manner analogous to the rod 58 of the device of FIGURE 1, to provide a measure of the location of piston 122. Cylinder 130, passage 132, and cylinder 104 are filled with an incompressible hydraulic fluid. Accordingly, the application of pressure through inlet 134 of cylinder 120 causes downward movement of piston 122, and lateral movement of piston 106 and plunger 108. Plunger 108 moves laterally into contact with the interior surface of the tube 100, and thereby applies force to and deflects the tube. Pressure sensitive transducer 148 provides a measure of the hydraulic pressure applied to piston 106, and therefore also of the force applied by plunger 108 to the interior surface of the tube. Rod 136 and the associated contacts provide a measure of the location of piston 122, and therefore also of the movement of plunger 108. It is evident that by the use of appropriate conventional electronic equipment, which again forms no part of the instant invention, measurements of the movement of plunger 108 and of the applied force, may readily be obtained.

In use, the device is inserted within a tube to be tested, and increasing fluid pressure is applied through inlet 134. Piston 106 and plunger 108 initially move freely, and there is no increase in pressure within cylinder 104 until plunger 108 strikes the interior surface of the tube. The tube then begins to deflect under the applied load, the pressure in cylinder 104 increases in proportion to the applied load, and piston 122 and plunger 108 move as determined by the relative diameters of plunger 126 and piston 106. After initial contact with the interior surface of the tube, every increase in pressure in cylinder 104 is accompanied by a corresponding movement of plunger 108 and therefore also of piston 122. The resistance of the portion of rod 136 between brush 142 and the terminal end 144 of the rod provides a measure of the position of piston 122, and therefore also of the position of plunger 108. Accordingly, by the use of conventional instrumentation as aforestated, individual pressure measurements and corresponding measurements of the position of rod 108 may be ascertained. This data may be plotted to produce a curve such as curve 80 of FIGURE 3. It is again preferred that the device be calibrated by producing a family of curves using a plurality of tubes of known inside diameter and wall thickness.

It will be evident that the device as described may be modified by connecting rod 136 to piston 106 instead of to piston 122. The movement of plunger 108 will thereby be more directly measured; however, it is preferred to connect the rod 136 to piston 122 to take advantage of the hydraulic leverage provided by the difference in diameters of plunger 126 and piston 106.

The embodiments of the invention in which a special property or privilege is claimed are defined as follows:

1. An apparatus insertable within a hollow cylindrical body for determining the localized wall thickness thereof comprising an electric motor, a shaft driven by said motor, said shaft having formed thereon a pair of axially spaced threads of opposed pitch, a pair of opposed nut members associated with said threads, a plurality of arms pivotably secured at one end to one said nut member, an equal number of arms pivotably secured at one end to the other said nut member, the other end of each said arm being pivotably secured to the other end of an arm secured to the opposite nut member, means for measuring the relative movement of said nut members, and means for measuring the stress in at least one said arm.

2. An apparatus in accordance with claim 1 in which said means for measuring stress comprises a stress gauge secured to said arm.

3. An apparatus insertable within a hollow cylindrical body for determining the localized wall thickness thereof comprising an electric motor, a shaft driven by said motor, said shaft having formed thereon a pair of axially spaced threads of opposite pitch, a pair of opposed nut members associated with said threads, a plurality of arms pivotably secured at one end to one said nut member, an equal number of arms pivotably secured at one end to the other said nut member, the other end of each said arm being pivotably secured to the other end of an arm secured to the opposite nut member, means for measuring the relative movement of said nut members comprising an electrical contact secured to one of said pair of nut members, and an electrical conductor of suitable resistance slidably engaged by said contact and operably secured to the other said nut member for motion therewith, and means for measuring the stress in at least one said arm.

References Cited in the file of this patent

UNITED STATES PATENTS

| | | |
|---|---|---|
| 1,231,964 | Suchanek | July 3, 1917 |
| 2,474,320 | Pelan | June 28, 1949 |
| 2,815,578 | Broussard | Dec. 10, 1957 |
| 2,927,459 | Farrington | Mar. 8, 1960 |
| 3,024,651 | McGlasson | Mar. 13, 1962 |
| 3,049,752 | Jorda et al. | Aug. 21, 1962 |